(12) United States Patent
Harter et al.

(10) Patent No.: US 11,649,664 B2
(45) Date of Patent: May 16, 2023

(54) WINDOW

(71) Applicant: Summit Outdoors, LLC, Fort Wayne, IN (US)

(72) Inventors: Joel E. Harter, Fort Wayne, IN (US); Scott Bokach, Kentwood, MI (US); Matthew Ruster, Zeeland, MI (US); Tony R. Cronk, Fort Wayne, IN (US)

(73) Assignee: Summit Outdoors, LLC, Fort Wayne, IN (US)

( * ) Notice: Subject to any disclaimer, the term of this patent is extended or adjusted under 35 U.S.C. 154(b) by 0 days.

(21) Appl. No.: 17/160,772

(22) Filed: Jan. 28, 2021

(65) Prior Publication Data
US 2021/0238912 A1     Aug. 5, 2021

Related U.S. Application Data

(60) Provisional application No. 62/967,617, filed on Jan. 30, 2020.

(51) Int. Cl.
| | |
|---|---|
| *E06B 3/44* | (2006.01) |
| *E06B 7/23* | (2006.01) |
| *E06B 1/04* | (2006.01) |
| *E06B 1/36* | (2006.01) |

(52) U.S. Cl.
CPC ............ *E06B 3/4415* (2013.01); *E06B 1/045* (2013.01); *E06B 1/36* (2013.01); *E06B 7/23* (2013.01)

(58) Field of Classification Search
CPC .......... E06B 3/4415; E06B 1/045; E06B 1/36; E06B 2009/2405; E06B 2009/2452; A01M 31/025

USPC ............................................. 52/212; 49/505
See application file for complete search history.

(56) References Cited

U.S. PATENT DOCUMENTS

| | | | |
|---|---|---|---|
| 2,854,705 A * | 10/1958 | McClaran | A01M 31/00 182/115 |
| 3,690,334 A | 9/1972 | Miller | |
| 4,430,831 A * | 2/1984 | Kemp | E04G 15/02 49/504 |
| 4,794,717 A | 1/1989 | Horsmann | |
| 7,743,781 B2 | 6/2010 | Slaughter | |
| 8,109,052 B2 * | 2/2012 | Rosende | E06B 1/6015 52/204.55 |
| 8,915,024 B2 | 12/2014 | Carter | |
| 9,644,380 B1 * | 5/2017 | Pigott, Jr. | E06B 1/345 |
| 10,557,302 B1 * | 2/2020 | Pigott, Jr. | E06B 1/345 |
| 2003/0196690 A1 | 10/2003 | Chu et al. | |
| 2007/0193614 A1 | 8/2007 | Egstad | |
| 2009/0044466 A1 * | 2/2009 | Andres | E06B 1/68 52/656.5 |
| 2009/0277094 A1 | 11/2009 | Ward | |
| 2011/0017251 A1 | 1/2011 | Overbaugh | |

(Continued)

*Primary Examiner* — Marcus Menezes
(74) *Attorney, Agent, or Firm* — Barnes & Thornburg LLP

(57) ABSTRACT

A window for use on a structure has a first frame, a second frame and a fascia. The structure has a wall having an interior surface, an exterior surface, and an opening extending through the wall from the interior surface to the exterior surface. The opening has an upper edge, a lower edge, a first side, and a second side. The first frame contacts the interior surface of the wall and extends through the opening. The second frame is positioned below the opening and contacts the interior surface of the wall. The fascia is connected to the first frame and contacts the exterior surface of the wall.

12 Claims, 11 Drawing Sheets

(56) References Cited

U.S. PATENT DOCUMENTS

| | | | | |
|---|---|---|---|---|
| 2014/0352217 A1* | 12/2014 | Blackburn | .............. | E06B 7/086 49/82.1 |
| 2015/0201608 A1* | 7/2015 | Steen | ........................ | E06B 5/00 49/504 |
| 2017/0284150 A1* | 10/2017 | Burton | .................... | E06B 3/968 |

* cited by examiner

WINDOW

This application is a regular utility patent application claiming priority of U.S. provisional patent Application Ser. No. 62/967,617, filed Jan. 30, 2020 ("the '617 Application"). The complete description, drawings and disclosure of the of the '617 Application are incorporated by reference in their entireties into the present application as if such description, drawings and disclosures were fully set forth herein.

The present invention relates to a window.

BACKGROUND AND SUMMARY OF THE INVENTION

Windows of various kinds are known in the art and are useful for permitting an occupant of a structure to view the exterior of the structure from the interior of the structure. Hunting blinds are one type of structure that utilize windows. Hunting blind windows typically allow the hunter to both view the exterior of the blind from within the blind and to extend a gun, bow or other weapon from the interior to the exterior. Examples of such hunting blind windows are shown, for example, in U.S. Pat. No. 8,915,024 B2 and U.S. Patent Application Publication No. 2009/0277094 A1.

In one embodiment of the present invention, a window includes a first frame, a second frame, a fascia, a seal, a first pane and a second pane. The first frame has a first horizontal member, a second horizontal member, a first vertical member, and a second vertical member. The first horizontal member, the first vertical member and the second vertical member each have a first channel, a second channel, a third channel, a fourth channel and a fifth channel. The second horizontal member has a first channel and a second channel. The second frame has a horizontal member, a first vertical member and a second vertical member. The first horizontal member, the first vertical member and the second vertical member each have a first channel, a second channel, and a third channel. The fascia has a first section and a retaining member extending from the first section. The retaining member is configured to engage the fourth channel of the first horizontal member of the first frame, the fourth channel of the first vertical member of the first frame, the fourth channel of the second vertical member of the first frame, and the first channel of the second horizontal member of the first frame. The seal is configured to engage the fifth channel of the first vertical member of the first frame, the fifth channel of the second vertical member of the first frame, and the second channel of the second horizontal member of the first frame. The first pane is moveable within the third channel of the first vertical member of the first frame, the third channel of the second vertical member of the first frame, the third channel of the first vertical member of the second frame, and the third channel of the second vertical member of the second frame. The second pane is moveable within the second channel of the first vertical member of the first frame, the second channel of the second vertical member of the first frame, the second channel of the first vertical member of the second frame, and the second channel of the second vertical member of the second frame.

In one embodiment, the fourth channel of the first horizontal member of the first frame is perpendicular to at least one of the second and third channels of the first horizontal member of the first frame.

In another embodiment, the second and third channels of the first vertical member of the first frame are parallel. In certain embodiments, the second and third channels of the first vertical member of the second frame are parallel.

In other embodiments, the second channel of the first vertical member of the first frame is aligned with the second channel of the first vertical member of the second frame, and the third channel of the first vertical member of the first frame is aligned with the third channel of the first vertical member of the second frame.

In certain embodiments, a first portion of the seal is located in the fifth channel of the second horizontal member of the first frame and a second portion of the seal extends from the fifth channel of the second horizontal member of the first frame. In one embodiment, the first pane is movable from a first position to a second position and the first pane maintains contact with the second portion of the seal as it moves from the first position to the second position.

In another embodiment, the window further includes at least one accessory and a connector. The connector has a first member connected to the accessory and a second member located in the first channel of the first vertical member of the first frame.

In one embodiment of the present invention, a window includes a first frame, a second frame, a fascia, a first pane and a second pane. The first frame has a first horizontal member, a second horizontal member, a first vertical member, and a second vertical member. The first horizontal member, the first vertical member and the second vertical member each have a first channel, a second channel, and a third channel. The second horizontal member has a first channel. The second frame has a horizontal member, a first vertical member and a second vertical member. The first horizontal member, the first vertical member and the second vertical member each have a first channel and a second channel. The fascia has a retaining member configured to engage the third channel of the first horizontal member of the first frame, the third channel of the first vertical member of the first frame, the third channel of the second vertical member of the first frame, and the first channel of the second horizontal member of the first frame. The first pane is moveable within the first channel of the first vertical member of the first frame, the first channel of the second vertical member of the first frame, the first channel of the first vertical member of the second frame, and the first channel of the second vertical member of the second frame from a first position to a second position. The second pane is moveable within the second channel of the first vertical member of the first frame, the second channel of the second vertical member of the first frame, the second channel of the first vertical member of the second frame, and the second channel of the second vertical member of the second frame from a first position to a second position.

In one embodiment, the first horizontal member of the first frame, the first vertical member of the first frame, and the second vertical member of the first frame each include a fourth channel, the second horizontal member of the first frame includes a second channel, and the window further includes a seal. The seal has a first portion located within the fourth channel of the first vertical member of the first frame, the fourth channel of the second vertical member of the first frame, and the second channel of the second horizontal member of the first frame, and a second portion extending from the fourth channel of the first vertical member of the first frame, the fourth channel of the second vertical member of the first frame, and the second channel of the second horizontal member of the first frame. In certain embodiments, the first pane maintains contact with the second portion of the seal extending from the second channel of the second horizontal member of the first frame as the first pane moves from the first position to the second position.

In one embodiment, at least one of the first vertical member of the first frame and the second vertical member of the first frame includes a fourth channel, and the window further includes at least one accessory and a connector. The connector has a first member connected to the accessory and a second member located in the fourth channel.

In one embodiment of the present invention, a window for use on a structure has a first frame, a second frame and a fascia. The structure has a wall having an interior surface, an exterior surface, and an opening extending through the wall from the interior surface to the exterior surface. The opening has an upper edge, a lower edge, a first side, and a second side. The first frame contacts the interior surface of the wall and extends through the opening. The second frame is positioned below the opening and contacts the interior surface of the wall. The fascia is connected to the first frame and contacts the exterior surface of the wall.

In one embodiment, the window includes a first pane moveable within the first and second frames from a first position to a second position. In certain embodiments, the first pane covers the opening when the first pane is in the first position and exposes the opening when the first pane is in the second position. In one embodiment, the first pane is opaque. In another embodiment, the window includes a second pane moveable in the first and second frames from a first position to a second position. In certain embodiments, the second pane covers the opening when the second pane is in the first position and exposes the opening when the second pane is in the second position. In one embodiment, the second pane is clear.

In another embodiment, the first frame includes a channel and the fascia includes a retaining member located within the channel.

In one embodiment, the first frame includes a channel, and the window further includes a seal having a first portion located within the channel and a second portion extending from the channel. In other embodiments, the window further includes a pane moveable within the first and second frames from a first position to a second position. The pane maintains contact with the seal as it moves from the first position to the second position.

These and other features of the present invention will become apparent to those of skill in the art from the following description and the accompanying drawings.

DETAILED DESCRIPTION OF EMBODIMENTS OF THE INVENTION

Figure 1:
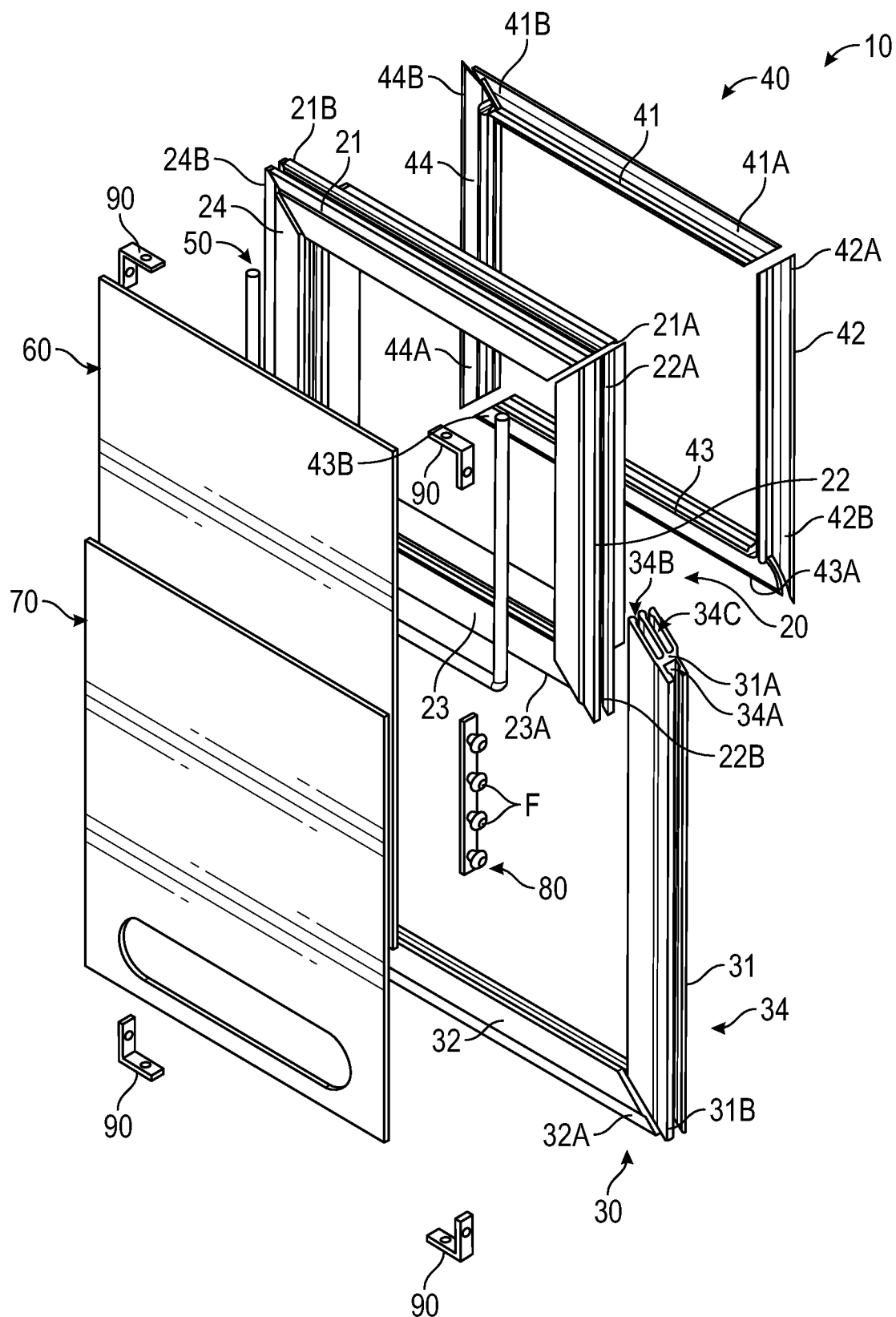
FIG. 1 is an exploded perspective view of a window according to one embodiment of the present invention.

FIG. 1 is an exploded perspective view of a window according to one embodiment of the present invention. In the embodiment shown, window 10 generally includes a first or upper frame 20, a second or lower frame 30, a fascia 40, a seal 50, an opaque pane 60, a clear pane 70, two connectors 80 and four brackets 90.

Frame 20, in the embodiment shown, has a first or upper horizontal member 21 having a first end 21A and a second end 21B, a first vertical member 22 having a first end 22A and a second end 22B, a second or lower horizontal member 23 having a first end 23A and a second end 23B, and a second vertical member 24 having a first end 24A and a second end 24B.

Figure 4:
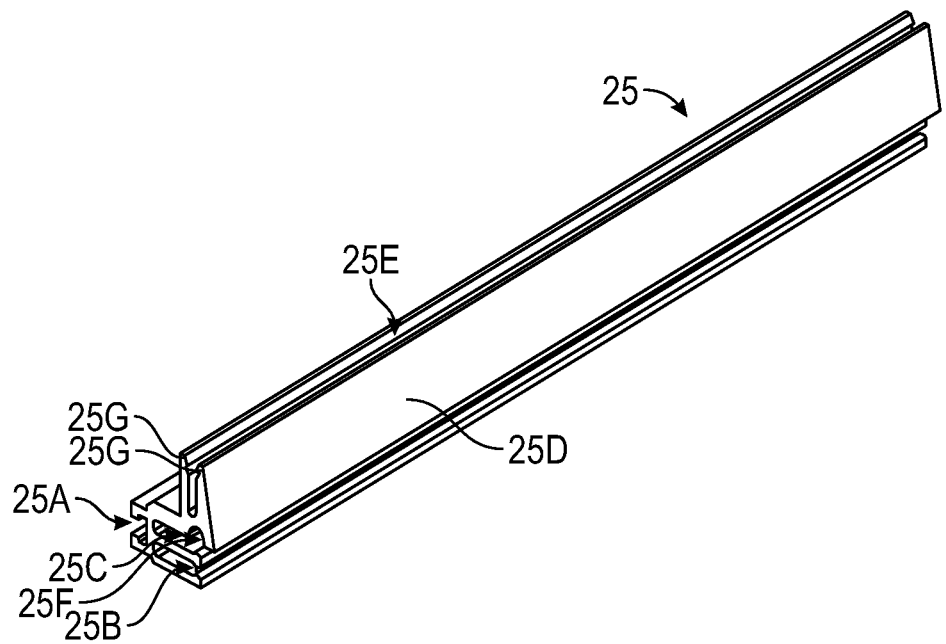
FIG. 4 is a perspective view of an extrusion that forms one or more members of a frame that is a component of the window shown in FIG. 1.
Figure 5:
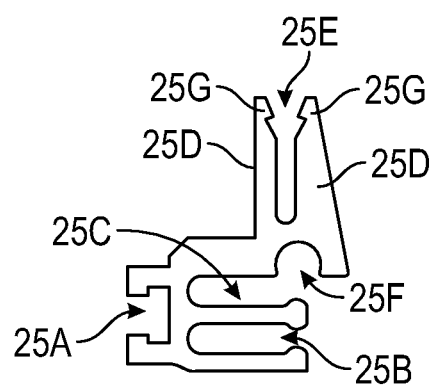
FIG. 5 is an end view of the extrusion shown in FIG. 4.

FIG. 4 is a perspective view of an extrusion 25 that can be utilized to form members 21, 22, and 24 of frame 20 according to certain embodiments of the present invention. In the embodiment shown in FIG. 4, extrusion 25 includes a first channel 25A, a second channel 25B, a third channel 25C, a section 25D having a fourth channel 25E, and a fifth channel 25F. Channel 25E, in the embodiment shown, includes a pair of retaining members 25G which help secure fascia 40 to frame 20 as described below. Fifth channel 25F is configured to receive seal 50 as described below.

Figure 7:
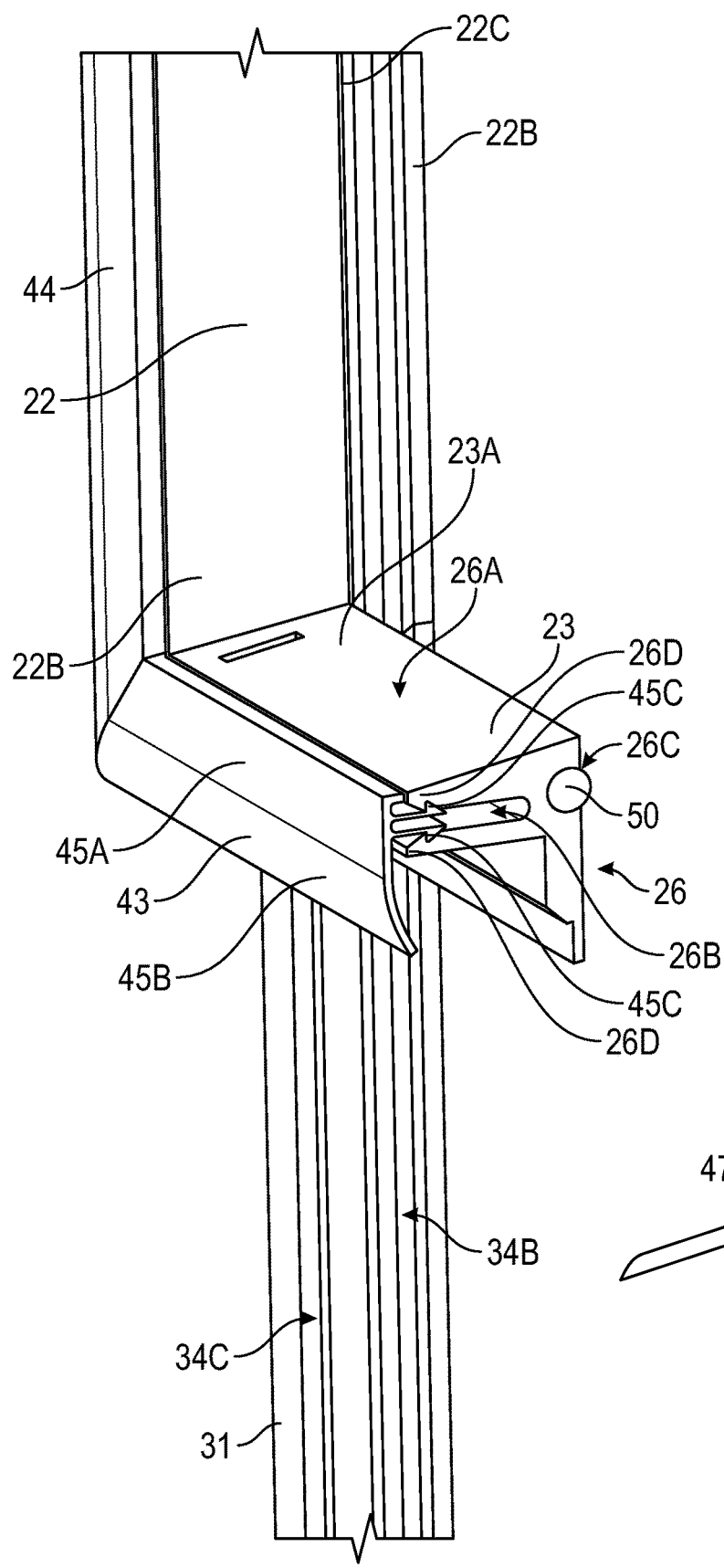
FIG. 7 is perspective view of a section of the assembled window shown in FIG. 1.

FIG. 7 is a partial sectional view of window 10. As shown in FIG. 7, member 23 of frame 20 can be formed from an extrusion 26. In the embodiment shown, extrusion 26 includes a section 26A having a first channel 26B, and a second channel 26C. First channel 26B includes a pair of retaining members 26D which help secure fascia 40 to frame 20 as described below. Second channel 26C is configured to receive seal 50 as described below.

Frame 30, in the embodiment shown, has a first vertical member 31 having a first end 31A and a second end 31B, a lower or horizontal member 32 having a first end 32A and a second end 32B, and a second vertical member 33 having a first end 33A and a second end 33B. In the embodiment shown, members 31, 32, and 33 are formed from an extrusion 34 having a first channel 34A, a second channel 34B, and a third channel 34C.

Fascia 40, in the embodiment shown, has a first or upper horizontal member 41 having a first end 41A and a second end 41B, a first vertical member 42 having a first end 42A and a second end 42B, a second or lower horizontal member 43 having a first end 43A and a second end 43B, and a second vertical member 44 having a first end 44A and a second end 44B.

Figure 6:
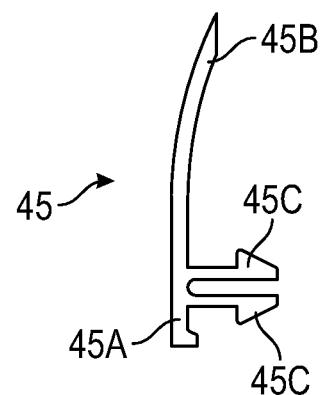
FIG. 6 is an end view of an extrusion that forms one or more members of a fascia that is a component of the window shown in FIG. 1.

FIG. 6 is an end view of an extrusion 45 that can be utilized to form members 41, 42, 43, and 44 of fascia 40 according to certain embodiments of the present invention. In the embodiment shown in FIG. 6, extrusion 45 includes a first, generally straight section 45A, a second, curved section 45B and a pair of retaining members 45C which help secure fascia 40 to frame 20 as described below.

Figure 6A:
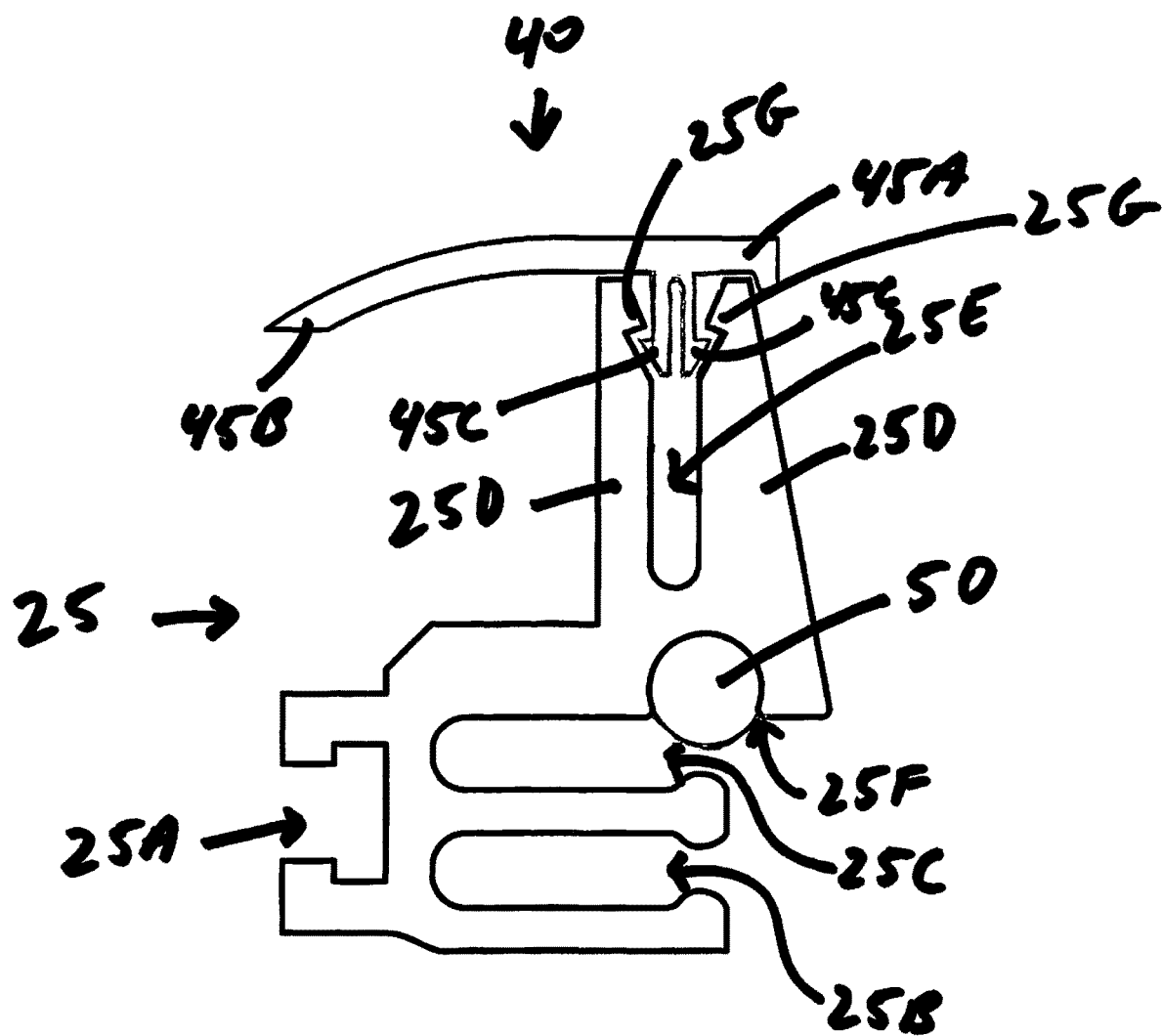
FIG. 6A is an end view of the extrusion shown in FIG. 4 with the fascia shown in FIG. 6 and a seal that is a component of the window shown in FIG. 1 connected to the extrusion.

Seal 50, in the embodiment shown, is a flexible, compressible cylindrical member that is sized and configured to be retained within channel 25F of extrusion 25 and channel 26B of extrusion 26 such that a portion of seal 50 extends outside of channels 25F and 26C (FIGS. 6A and 7). In the embodiment shown, seal 50 is a continuous, substantially U shaped member retained in members 22, 23, and 24 of frame 20. In other embodiments, seal 50 constitutes a plurality of separate sections. In other embodiments, seal 50 is configured (either as a continuous member or separate sections) so as to be retained in one or more of members 21, 22, 23 and 24 of frame 20 in any combination.

Opaque pane 60 is sized and configured to fit and slide within channel 25C of extrusion 25 and channel 34C of extrusion 34. Clear pane 70 is sized and configured to fit and slide within channel 25B of extrusion 25 and channel 34B of extrusion 34.

Figure 2:
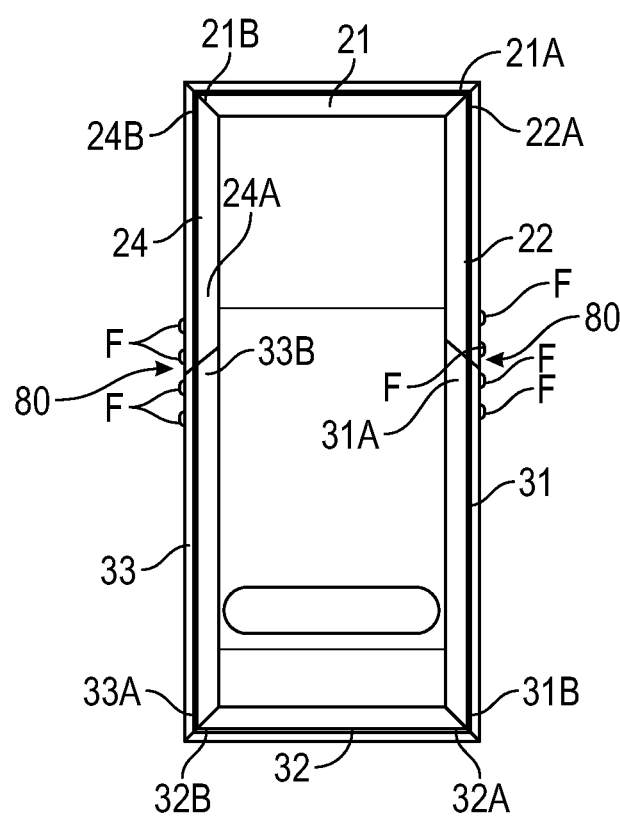
FIG. 2 is a front elevational view of the assembled window shown in FIG. 1.
Figure 3:
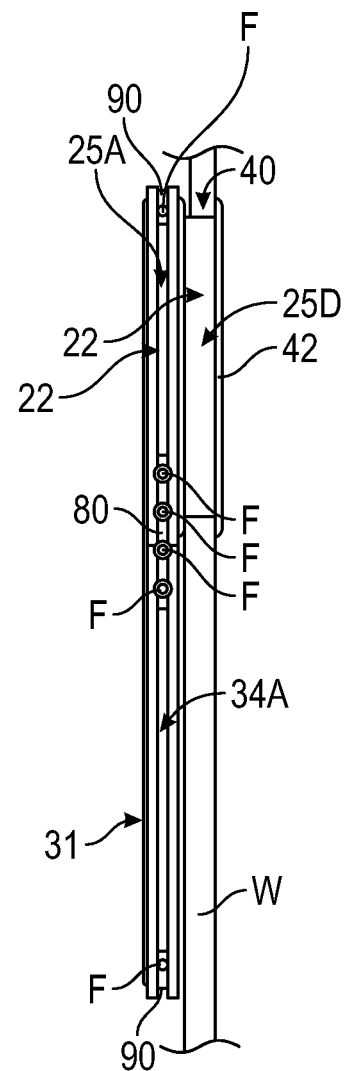
FIG. 3 is a first side elevational view of the assembled window shown in FIG. 1.

To assemble window 10, members 21, 22 and 24 of frame 20 are connected by positioning brackets 90 in channels 25A of members 21, 22 and 24 and securing brackets 90 to members 21, 22 and 24 with fasters F. Member 23 of frame 20 is secured to members 22 and 24 by use of brackets and fasteners (not shown). Seal 50 is inserted in one or more of channels 25F in members 21, 22, and 24 and channel 26C of member 23, depending on the configuration of seal 50 selected for a particular window 10. Members 31, 32, and 33 of fame 30 are connected by positioning brackets 90 in channels 34A of members 31, 3,2 and 33 and securing brackets 90 to members 31, 32, and 33 with fasteners F. Opaque pane 60 is positioned in channel 25C of members 22 and 24 of frame 20 and in channels 34C of members 31 and 33 of frame 30. Clear pane 70 is positioned in channel 25B of members 22 and 24 of frame 20 and 34B of members 31 and 33 of frame 30. Member 22 of frame 20 and member 31 of frame 30 are connected by inserting one connector 80 in channel 25A of member 22 and channel 34A of member 31 and securing connector 80 to members 22 and 31 with fasteners F. Member 24 of frame 20 and member 33 of frame 30 are connected by inserting one connector 80 in channel 25A of member 24 and channel 34A of member 33 and securing connector 80 to members 24 and 33 with fasteners F. (See FIGS. 2 and 3).

Figure 8:
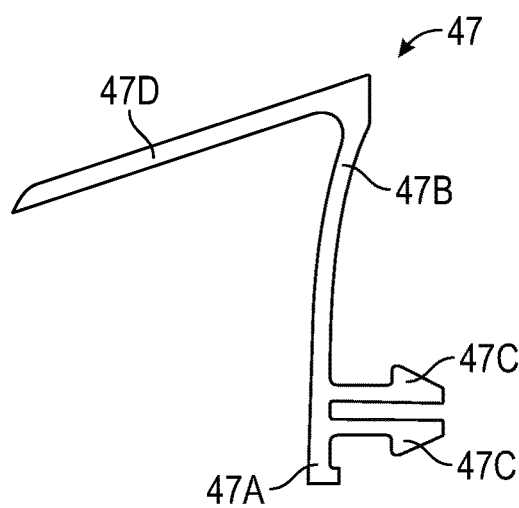
FIG. 8 is an end view of an extrusion that forms one or more members of a fascia that is a component of the window shown in FIG. 1 according to another embodiment of the present invention.

Sections 25D of members 21, 22, and 24 and section 26A of member 23 of assembled frame 20 can extend through a window opening WO in a wall W such that channels 25E and 26B face the exterior of a building or shelter, such as a house, barn, shed or hunting blind. (See FIG. 3) Fascia 40 can be secured to frame 20 by inserting retaining members 45C of fascia 40 into channels 25E of members 21, 22, and 24 of frame 20 so that they engage retaining members 25G and by inserting retaining members 45C of fascia 40 into channel 26B of member 23 of frame 20 so that they engage retaining members 26D. In one embodiment of the invention, retaining members 45C of fascia 40 are flexible so that they compress toward each other as they are inserted into channels 25E and 26B and expand after they are positioned sufficiently deep in channels 25E and 26B to engage retaining members 25G and 26D. In an alternative embodiment of the invention, member 41 of fascia 40 can be replaced with an extrusion 47 as shown in FIG. 8. In the embodiment shown in FIG. 8, extrusion 47 includes a first, generally straight section 47A, a second, curved section 47B, a pair of retaining members 47C and a ledge 47D that extends outwardly from one end of curved section 47B and acts as a drip shield over window opening WO.

Figure 14:
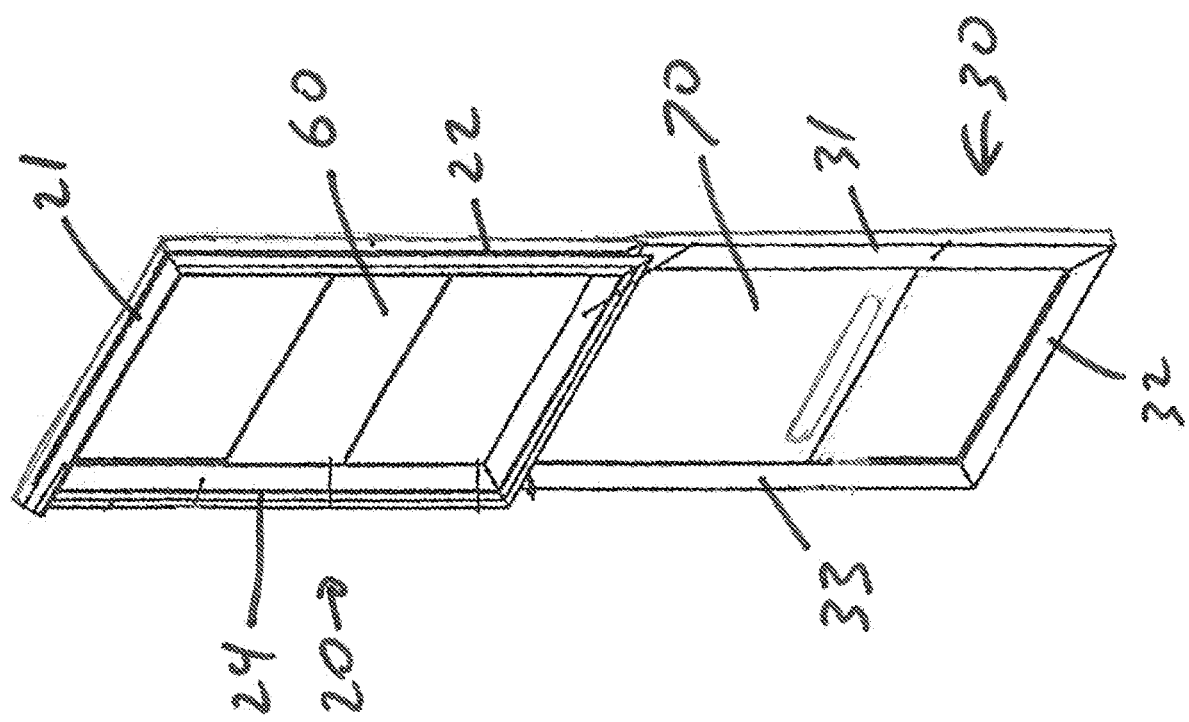
FIG. 14 is a perspective view of the window shown in FIG. 1 with two panes that are components of the window shown in FIG. 1 in the open position.

As assembled, opaque panel 60 and clear panel 70 can slide in frames 20 and 30 independently of one another. In this manner, the user can position both opaque panel 60 and clear panel 70 in the open position (FIG. 14) so as to provide access from the interior of the structure, such as a hunting blind, through window opening WO. The user can also position opaque panel 60 in the open position and clear panel 70 in the closed position so that the user can see from the interior of the structure to the exterior. The user can also position opaque panel 60 in the closed position so that it acts as a blind over window opening WO. Window 10 can be provided with retaining members to hold opaque panel 60 and clear panel 70 in the desired open or closed positions. Note that because seal 50 is sized and configured to extend outside of channels 25F and 26C, opaque panel 60 will remain in contact with and compress seal 50 so as to prevent water and the elements from entering the structure.

Figure 9:
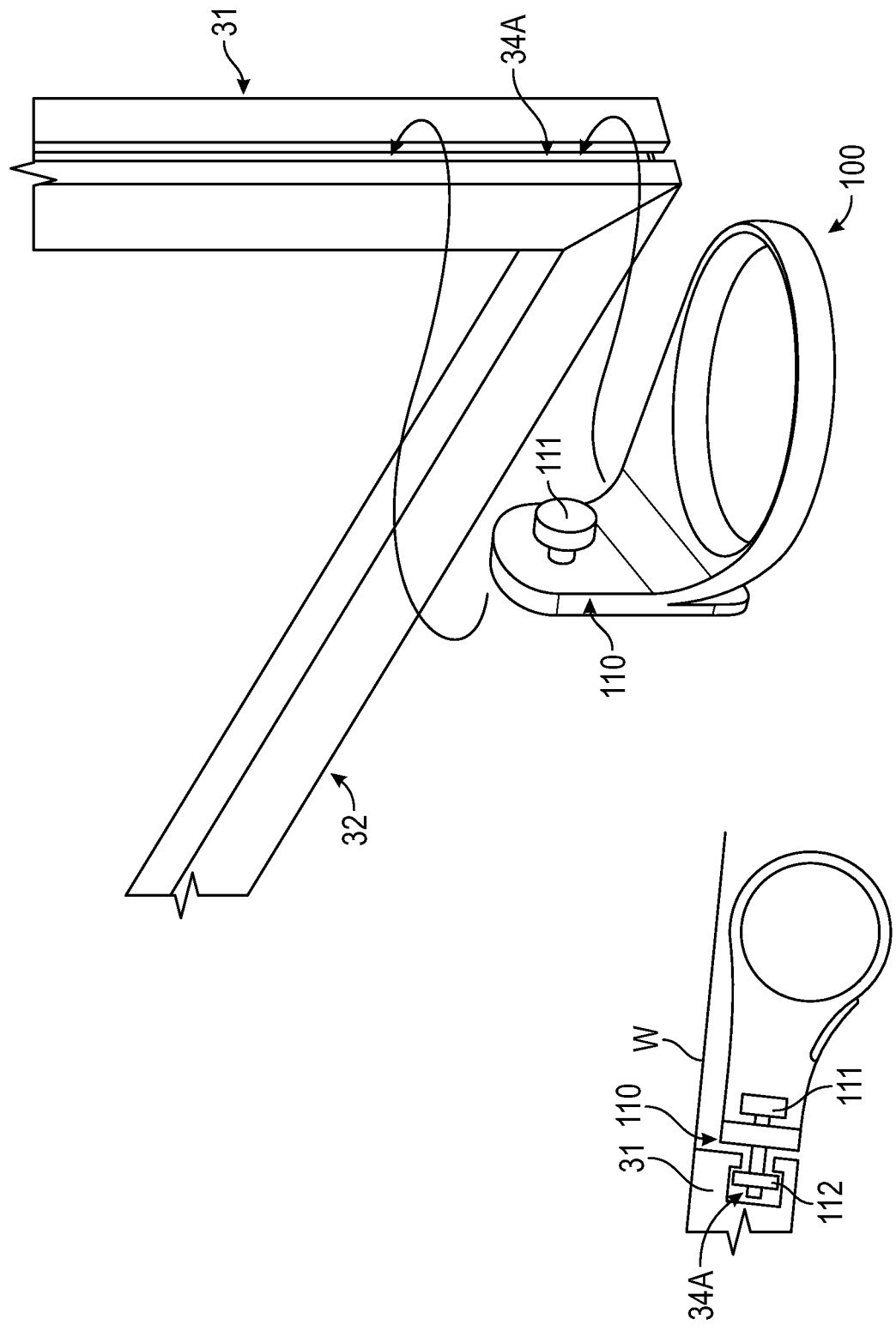
FIG. 9 is a perspective view of a cup holder that is a component of the window shown in FIG. 1 according to another embodiment of the present invention.

FIGS. 9-13 show a variety of accessories for use with window 10 according to various embodiments of the present invention. FIG. 9 illustrates a cup holder 100 that can be attached to window 10 by connector 110. Connector 110 includes a threaded fastener 111 and a threaded nut or retainer 112. Retainer 112, in the embodiment shown, is sized and configured so that it can slide longitudinally within channel 25A of members 21, 22, and 24 of frame 20 and within channel 34A of members 31, 32, and 33 of frame 30, but cannot be removed laterally from channels 25A and 34A. As shown in FIG. 9, cup holder 100 can be connected to window 10 at a desired location by positioning retaining member 112 at the desired location in channel 34A of, for example, member 31 of frame 30 and utilizing threaded fastener 111 to clamp cup holder 100 to member 31.

Figure 10:
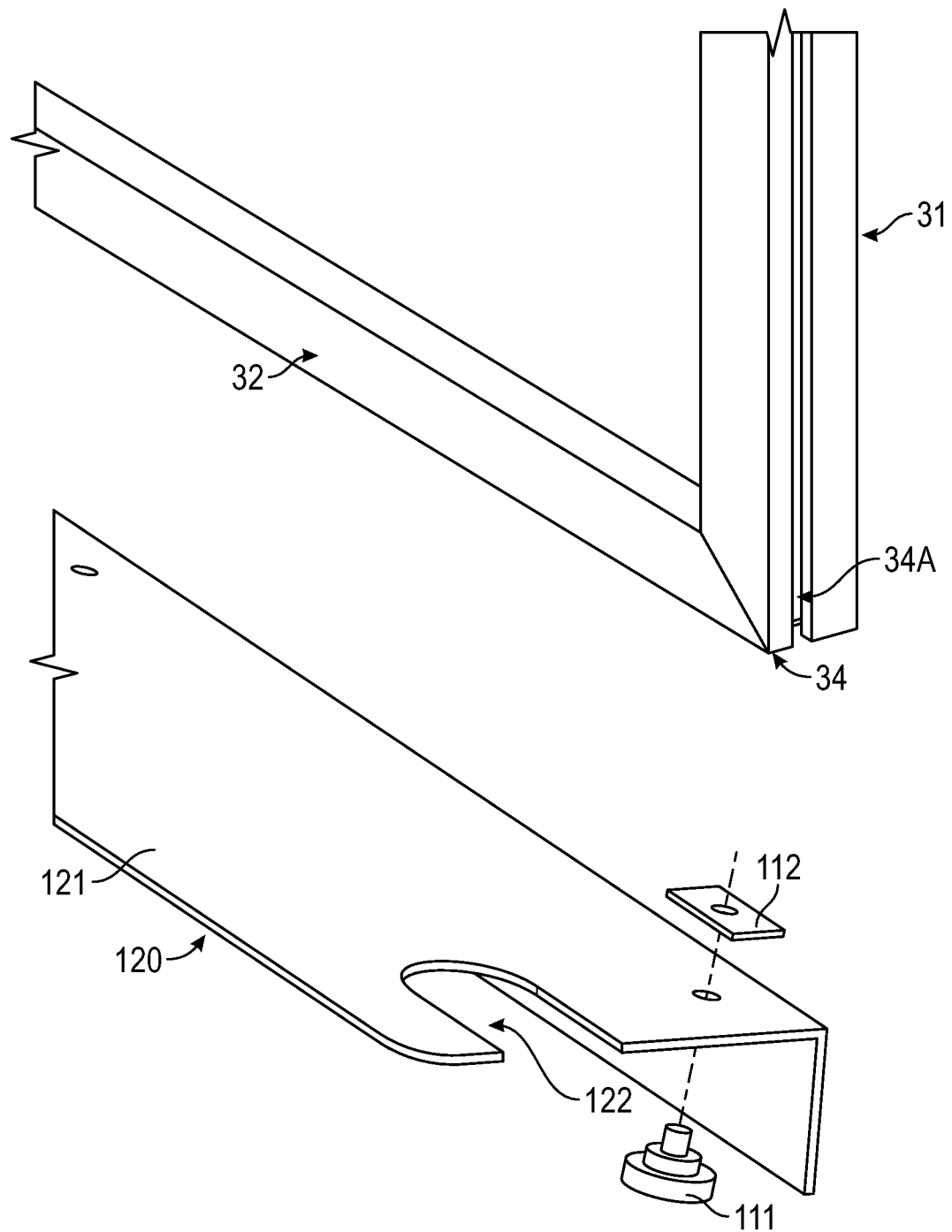
FIG. 10 is a perspective view of a shelf that is a component of the window shown in FIG. 1 according to another embodiment of the present invention.

FIG. 10 shows a gun rest 120 that can be connected to window 10 utilizing connector 110. In this embodiment, gun rest 120 includes a first section on which a hunter can steady a gun and a notch 122 for retaining the gun in a vertical orientation when not in use.

Figure 11:
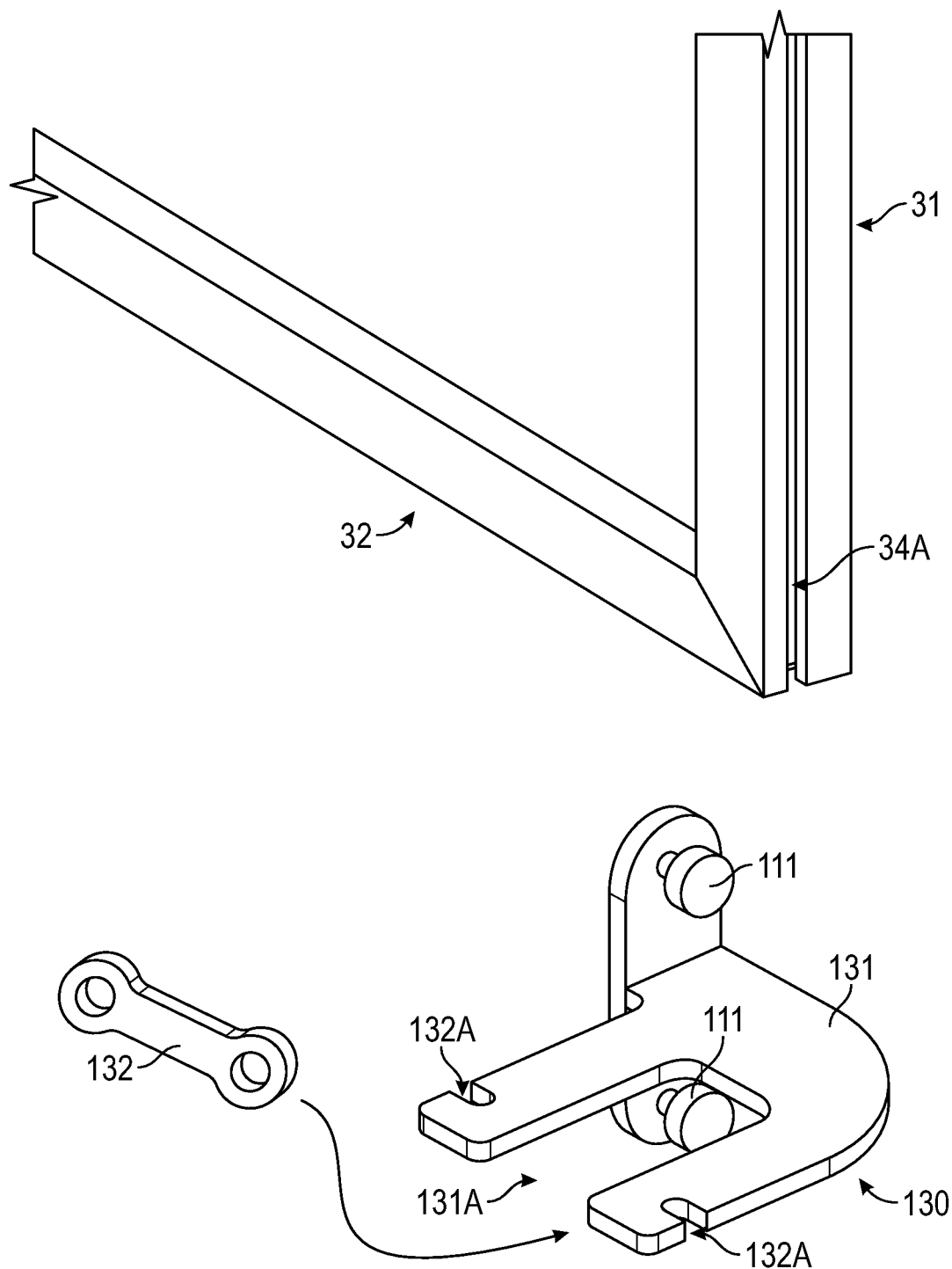
FIG. 11 is a perspective view of a weapon holder that is a component of the window shown in FIG. 1 according to another embodiment of the present invention.

FIG. 11 shows a weapon holder 130 that can be connected to window 10 utilizing connector 110. Weapon holder 130, in the embodiment shown, includes a generally U shaped base 131 having a slot 131A for receiving, for example, a gun or bow when not in use. Base 131 further includes two notches 132A for receiving a retaining member 132 to hold the weapon within slot 131A. In certain embodiments of the invention, retaining member 132 is an elastic member that can be stretched across slot 131A and which includes openings 132B for engaging notches 132A.

Figure 12:
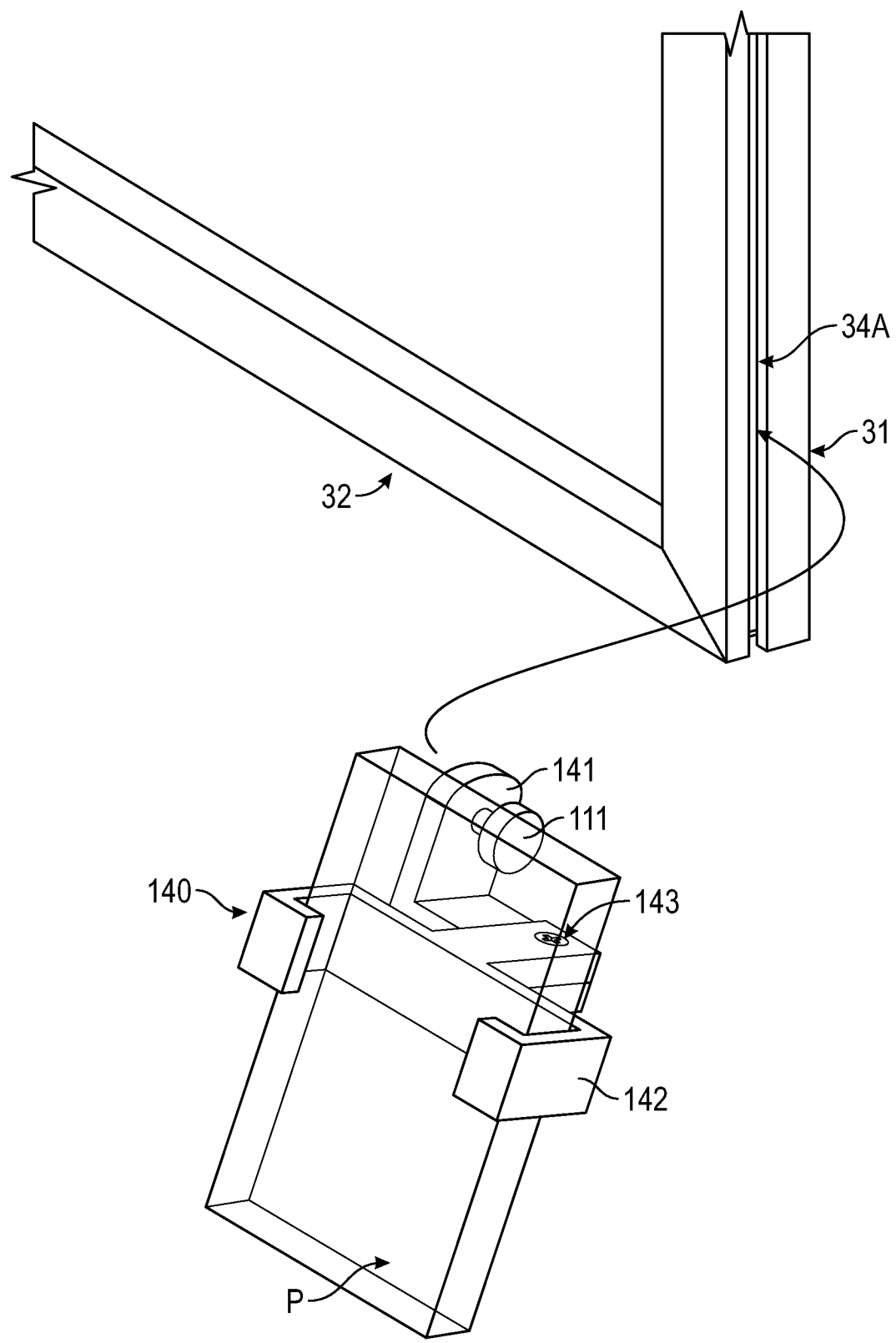
FIG. 12 is a perspective view of a cell phone holder that is a component of the window shown in FIG. 1 according to another embodiment of the present invention.

FIG. 12 shows a cell phone holder 140 that can be connected to window 10 utilizing connector 110. In the embodiment shown, cell phone holder 140 includes a base member 141 that can be secured to, for example, member 31 of frame 30, and a retaining member 142 for receiving a cell phone P. Retaining member 142 can be pivotally connected to base member 141 by, for example, a pin 143.

Figure 13:
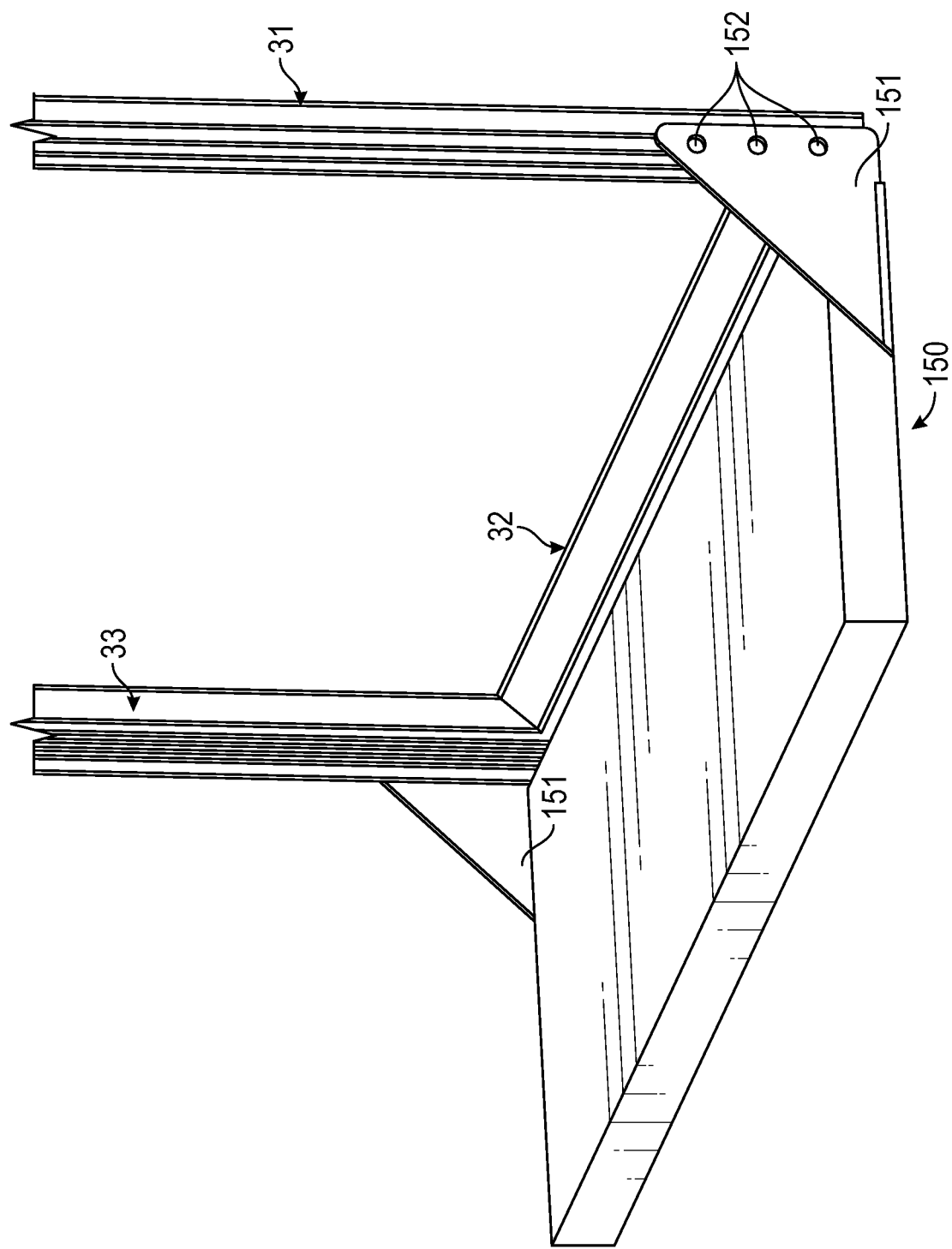
FIG. 13 is a perspective view of a shelf that is a component of the window shown in FIG. 1 according to another embodiment of the present invention.

FIG. 13 shows a shelf that can be connected to window 10 utilizing connector 110. In the embodiment shown, a pair of brackets 151 having one or more openings 152 is secured to shelf 150 and to, for example, members 31 and 33 of frame 30 via one or more connectors 110.

Although the present invention has been shown and described in detail, the same is by way of example only and should not be taken as a limitation on the invention. Numerous modifications can be made to the embodiments disclosed without departing from the scope of the present invention. For example, extrusions 25, 26, and 34 are not limited to the specific configurations illustrated in the figures. Nor is fascia 40 limited to the specific configurations shown. Accessories other than those shown in FIGS. 9-13 can also be utilized with the present invention. Other modifications are also possible within the scope of the invention.

What is claimed is:

1. A window, including:
   a first frame, the first frame having a first horizontal member, a second horizontal member, a first vertical member, and a second vertical member, the first horizontal member of the first frame, the first vertical member of the first frame and the second vertical member of the first frame each having a first channel, a second channel, a third channel, a fourth channel and a fifth channel, and the second horizontal member of the first frame having a first channel and a second channel;
   a second frame, the second frame having a first horizontal member, a first vertical member and a second vertical member, the first horizontal member of the second frame, the first vertical member of the second frame and the second vertical member of the second frame each having a first channel, a second channel, and a third channel;
   a fascia having a first section and a retaining member extending from the first section, the retaining member configured to engage the fourth channel of the first horizontal member of the first frame, the fourth channel of the first vertical member of the first frame, the fourth channel of the second vertical member of the first frame, and the first channel of the second horizontal member of the first frame;
   a seal configured to engage the fifth channel of the first vertical member of the first frame, the fifth channel of the second vertical member of the first frame, and the second channel of the second horizontal member of the first frame;
   a first pane moveable within the third channel of the first vertical member of the first frame, the third channel of the second vertical member of the first frame, the third channel of the first vertical member of the second frame, and the third channel of the second vertical member of the second frame; and
   a second pane moveable within the second channel of the first vertical member of the first frame, the second channel of the second vertical member of the first frame, the second channel of the first vertical member of the second frame, and the second channel of the second vertical member of the second frame.

2. The window according to claim 1, wherein the fourth channel of the first horizontal member of the first frame is perpendicular to at least one of the second and third channels of the first horizontal member of the first frame.

3. The window according to claim 1, wherein the second and third channels of the first vertical member of the first frame are parallel.

4. The window according to claim 1, wherein the second and third channels of the first vertical member of the second frame are parallel.

5. The window according to claim 1, wherein the second channel of the first vertical member of the first frame is aligned with the second channel of the first vertical member of the second frame, and the third channel of the first vertical member of the first frame is aligned with the third channel of the first vertical member of the second frame.

6. The window according to claim 1, wherein a first portion of the seal is located in the fifth channel of the second horizontal member of the first frame and a second portion of the seal extends from the fifth channel of the second horizontal member of the first frame.

7. The window according to claim 6, wherein the first pane is movable from a first position to a second position and the first pane maintains contact with the second portion of the seal as it moves from the first position to the second position.

8. The window according to claim 1, further including at least one accessory and a connector, the connector having a first member connected to the accessory and a second member located in the first channel of the first vertical member of the first frame.

9. A window, including:
   a first frame, the first frame having a first horizontal member, a second horizontal member, a first vertical member, and a second vertical member, the first horizontal member of the first frame, the first vertical member of the first frame and the second vertical member of the first frame each having a first channel, a second channel, and a third channel, and the second horizontal member of the first frame having a first channel;
   a second frame, the second frame having a first horizontal member, a first vertical member and a second vertical member, the first horizontal member of the second frame, the first vertical member of the second frame and the second vertical member of the second frame each having a first channel and a second channel;
   a fascia having a retaining member configured to engage the third channel of the first horizontal member of the first frame, the third channel of the first vertical member of the first frame, the third channel of the second vertical member of the first frame, and the first channel of the second horizontal member of the first frame;
   a first pane moveable within the first channel of the first vertical member of the first frame, the first channel of the second vertical member of the first frame, the first channel of the first vertical member of the second frame, and the first channel of the second vertical member of the second frame from a first position to a second position; and
   a second pane moveable within the second channel of the first vertical member of the first frame, the second channel of the second vertical member of the first frame, the second channel of the first vertical member of the second frame, and the second channel of the second vertical member of the second frame from a first position to a second position.

10. The window according to claim 9, wherein:
   the first horizontal member of the first frame, the first vertical member of the first frame, and the second vertical member of the first frame each include a fourth channel;
   the second horizontal member of the first frame includes a second channel; and
   further including a seal, the seal having a first portion located within the fourth channel of the first vertical member of the first frame, the fourth channel of the second vertical member of the first frame, and the second channel of the second horizontal member of the first frame, and a second portion extending from the fourth channel of the first vertical member of the first frame, the fourth channel of the second vertical member of the first frame, and the second channel of the second horizontal member of the first frame.

11. The window according to claim 10, wherein the first pane maintains contact with the second portion of the seal extending from the second channel of the second horizontal member of the first frame as the first pane moves from the first position to the second position.

12. The window according to claim 11, wherein at least one of the first vertical member of the second frame and the second vertical member of the second frame includes a third channel, and further including at least one accessory and a connector, the connector having a first member connected to the accessory and a second member located in the third channel.

* * * * *